(12) United States Patent
Kato et al.

(10) Patent No.: US 7,705,771 B2
(45) Date of Patent: Apr. 27, 2010

(54) RADAR APPARATUS AND MOUNTING STRUCTURE FOR RADAR APPARATUS

(75) Inventors: Yasuke Kato, Nisshin (JP); Akihisa Fujita, Kariya (JP); Yutaka Aoki, Nisshin (JP)

(73) Assignee: Denso Corporation, Kariya (JP)

( * ) Notice: Subject to any disclaimer, the term of this patent is extended or adjusted under 35 U.S.C. 154(b) by 12 days.

(21) Appl. No.: 12/289,012

(22) Filed: Oct. 17, 2008

(65) Prior Publication Data
US 2009/0140912 A1 Jun. 4, 2009

(30) Foreign Application Priority Data
Oct. 19, 2007 (JP) .............................. 2007-272708

(51) Int. Cl.
*G01S 7/28* (2006.01)
*G01S 13/93* (2006.01)

(52) U.S. Cl. .......................... 342/70; 342/175; 342/88; 343/872

(58) Field of Classification Search .................. 342/70, 342/175, 82–85, 88; 343/872, 753, 755
See application file for complete search history.

(56) References Cited

U.S. PATENT DOCUMENTS

| | | | | |
|---|---|---|---|---|
| 4,346,774 | A * | 8/1982 | Hirota et al. ................ | 180/167 |
| 6,034,642 | A * | 3/2000 | Kojima et al. ............... | 343/753 |
| 6,160,520 | A * | 12/2000 | Muhlhauser et al. ........ | 343/755 |
| 6,249,242 | B1 * | 6/2001 | Sekine et al. ................ | 342/70 |
| 6,433,751 | B1 * | 8/2002 | Ishitobi et al. .............. | 343/753 |
| 6,496,138 | B1 * | 12/2002 | Honma ........................ | 342/70 |
| 7,148,838 | B2 * | 12/2006 | Kakishita et al. ............ | 342/70 |
| 7,528,613 | B1 * | 5/2009 | Thompson et al. .......... | 324/637 |
| 2005/0024261 | A1 * | 2/2005 | Fujita .......................... | 342/174 |
| 2009/0140911 | A1 * | 6/2009 | Kato et al. .................... | 342/70 |
| 2009/0140912 | A1 * | 6/2009 | Kato et al. .................... | 342/70 |
| 2009/0146865 | A1 * | 6/2009 | Watanabe et al. ............ | 342/27 |

FOREIGN PATENT DOCUMENTS

GB        2169866 A * 7/1986

(Continued)

OTHER PUBLICATIONS

Japanese Office Action dated Jul. 21, 2009, issued in corresponding Japanese Application No. 2007-272708, with English translation.

*Primary Examiner*—John B Sotomayor
(74) *Attorney, Agent, or Firm*—Nixon & Vanderhye PC

(57) ABSTRACT

The radar apparatus includes an antenna device including a transmitting antenna and a receiving antenna, and a main body which generates an FMCW-modulated radar wave, transmits the radar wave from the transmitting antenna at a transmit timing, and receives the radar wave reflected from an obstacle by the receiving antenna at a receive timing, the transmit timing and the receive timing temporally overlap each other at least partially. The radar apparatus further includes a cover member covering the main body and the antenna device on a side of a transmission direction of the radar wave and located out of contact with the main body and the antenna device, the cover member having a transmission portion allowing the radar wave to pass therethrough, a surface of the transmission portion facing the antenna device being out of perpendicular alignment with the transmission direction.

14 Claims, 8 Drawing Sheets

FOREIGN PATENT DOCUMENTS

| | | |
|---|---|---|
| JP | 63-169705 | 11/1988 |
| JP | 64-082804 | 3/1989 |
| JP | 2001-127523 | 5/2001 |
| JP | 2002-071788 | 3/2002 |
| JP | 2002286855 A * | 10/2002 |
| JP | 2003-240838 | 8/2003 |
| JP | 2005049310 A * | 2/2005 |
| JP | 2005-321325 | 11/2005 |
| JP | 2007-201868 | 8/2007 |
| JP | 2009103457 A * | 5/2009 |
| JP | 2009103458 A * | 5/2009 |

* cited by examiner

FRONT VIEW   A-A' CROSS SECTION

DIRECTIVITY OF TRANSMITTED WAVE

FIG. 6

| | 7.36~12.36 | 13.36~17.36 | 18.36~22.36 | 23.36~27.36 | 28.36~32.36 | 33.36~37.36 | 38.36~ |
|---|---|---|---|---|---|---|---|
| φ=±0deg — BUMPER MATERIAL A | ○ | ○ | ○ | ○ | ○ | × | × |
| φ=±0deg — BUMPER MATERIAL B | ○ | ○ | ○ | × | × | × | × |
| φ=±0deg — BUMPER MATERIAL C | ○ | ○ | ○ | ○ | × | × | × |
| φ=±1deg — BUMPER MATERIAL A | ○ | ○ | ○ | ○ | ○ | × | × |
| φ=±1deg — BUMPER MATERIAL B | ○ | ○ | ○ | × | × | × | × |
| φ=±1deg — BUMPER MATERIAL C | ○ | ○ | ○ | ○ | × | × | × |
| φ=±2deg — BUMPER MATERIAL A | ○ | ○ | ○ | ○ | ○ | ○ | ○ |
| φ=±2deg — BUMPER MATERIAL B | ○ | ○ | ○ | ○ | × | × | × |
| φ=±2deg — BUMPER MATERIAL C | ○ | ○ | ○ | ○ | × | × | × |
| φ≧±3deg — BUMPER MATERIAL A | ○ | ○ | ○ | ○ | ○ | ○ | ○ |
| φ≧±3deg — BUMPER MATERIAL B | ○ | ○ | ○ | ○ | ○ | ○ | ○ |
| φ≧±3deg — BUMPER MATERIAL C | ○ | ○ | ○ | ○ | ○ | ○ | ○ |

FIG. 9
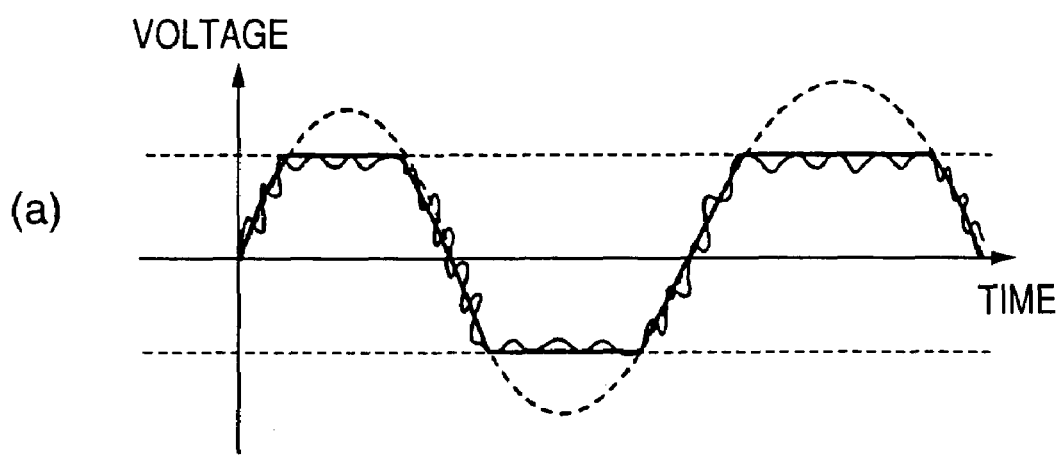
(a)
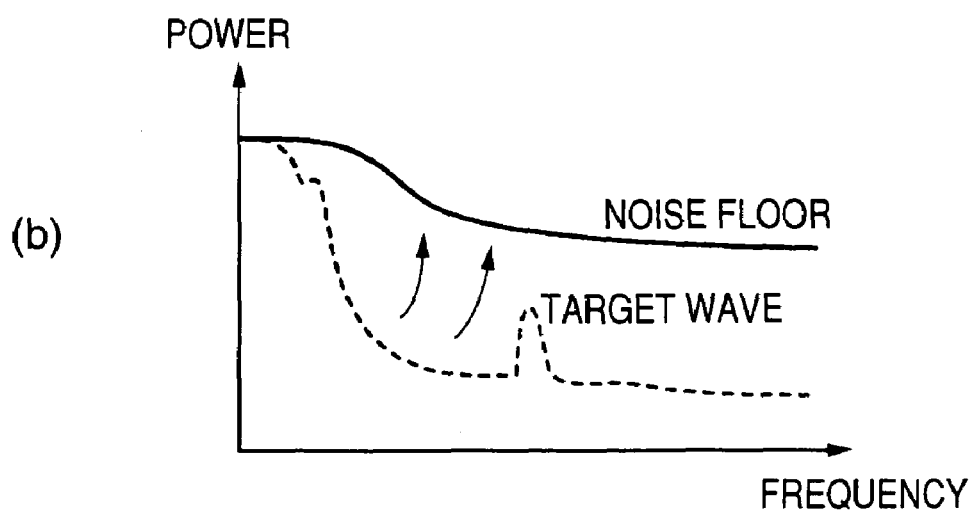
(b)

RADAR APPARATUS AND MOUNTING STRUCTURE FOR RADAR APPARATUS

CROSS-REFERENCE TO RELATED APPLICATION

This application is related to Japanese Patent Application No. 2007-272708 filed on Oct. 19, 2007, the contents of which are hereby incorporated by reference.

BACKGROUND OF THE INVENTION

1. Field of the Invention

The present invention relates to a radar apparatus, and a holding structure of the radar apparatus.

2. Description of Related Art

As described, for example, in Japanese Patent Application Laid-open No. 2003-240838, it is known to mount a radar apparatus on the inner surface of a bumper of a vehicle so as to be covered by the bumper as a cover member.

However, when a radar apparatus is mounted on the inner surface of a bumper, there is possibility that the radar apparatus is damaged by the bumper when the bumper vibrates even slightly, or when the bumper is hit by a stone or the like.

It may occur that the radar apparatus is mounted not on the inner surface of the bumper, but fixed to a certain member located inside a vehicle body so that there is some distance between the radar apparatus and the bumper. However, in this case, the radar apparatus undergoes significantly large effect of the radar wave reflected from the bumper. That is, in this case, since the input level of the radar wave reflected from the bumper becomes very large with respect to a sensitivity of a receiver of the radar apparatus, and accordingly the level of the received radar wave becomes saturated in a receiver circuit of the receiver, it becomes very difficult for the radar apparatus to accurately detect an obstacle (a detection target), if the radar apparatus is configured to receive the reflected radar wave while transmitting the radar wave.

This is further explained below with reference to FIGS. 8 and 9. FIG. 8 is a diagram explaining an obstacle detecting process performed by the radar apparatus in a normal state, and FIG. 9 is a diagram explaining an obstacle detecting process performed by the radar apparatus when the level of the received radar wave saturates in the receiver circuit.

A receiving antenna of the radar apparatus receives a mixture of the radar wave reflected from the obstacle, and the radar wave reflected from the bumper. This received mixture is converted into digital values by an A/D converter (see (a) and (b) of FIG. 8). By detecting through FFT analysis a peak of the digital values, which corresponds to the obstacle, the obstacle can be detected normally (see (c) of FIG. 8).

That is, in the normal state in which the level of the received reflected radar wave does not exceed the sensitivity range of the receiver circuit, the obstacle can be detected normally. On the other hand, if the level of the received wave saturates in the receiver circuit, that is, if the level of the received reflected radar wave exceeds the sensitivity range of the receiver circuit, portions of the received reflected radar wave outside the sensitivity range are cut off. In this case, a noise level (a noise floor) relative to the input level of the radar wave reflected from the obstacle may rise to such an extent that the radar wave reflected from the obstacle is buried in the noise even after performing FFT, as a result of which it becomes difficult to detect the obstacle (see (b) of FIG. 9).

SUMMARY OF THE INVENTION

The present invention provides a radar apparatus comprising:

an antenna device including a transmitting antenna and a receiving antenna;

a main body which generates an FMCW-modulated radar wave, transmits the radar wave from the transmitting antenna at a transmit timing, and receives the radar wave reflected from an obstacle by the receiving antenna at a receive timing, the transmit timing and the receive timing temporally overlap each other at least partially; and a cover member covering the main body and the antenna device on a side of a transmission direction of the radar wave and located out of contact with the main body and the antenna device, the cover member having a transmission portion allowing the radar wave to pass therethrough, a surface of the transmission portion facing the antenna device being out of perpendicular alignment with the transmission direction.

The present invention also provides a radar apparatus comprising:

an antenna device including a transmitting antenna and a receiving antenna;

a main body which generates an FMCW-modulated radar wave, transmits the radar wave from the transmitting antenna at a transmit timing, and receives the radar wave reflected from an obstacle by the receiving antenna at a receive timing, the transmit timing and the receive timing temporally overlap each other at least partially; and a cover member covering the main body and the antenna device on a side of a transmission direction of the radar wave and located out of contact with the main body and the antenna device, the cover member having a transmission portion allowing the radar wave to pass therethrough, a distance between the transmission portion and the receiving antenna being shorter than 6 times a wavelength of the radar wave.

The present invention also provides a radar mounting structure for mounting a radar apparatus configured to transmit an FMCW-modulated radar wave at a transmit timing, and receive the radar wave reflected from an obstacle at a receive timing, the transmit timing and the receive timing temporally overlap each other at least partially, the radar mounting structure comprising:

a frame member to which the radar apparatus is fixed; and a cover member covering the radar apparatus on a side of a transmission direction of the radar wave and located out of contact with the radar apparatus, the cover member having a transmission portion allowing the radar wave to pass therethrough, a surface of the transmission portion facing the antenna device being out of perpendicular alignment with the transmission direction.

The present invention also provides a radar mounting structure for mounting a radar apparatus configured to transmit an FMCW-modulated radar wave at a transmit timing, and receive the radar wave reflected from an obstacle at a receive timing, the transmit timing and the receive timing temporally overlap each other at least partially, the radar mounting structure comprising:

a frame member to which the radar apparatus is fixed; and a cover member covering the radar apparatus on a side of a transmission direction of the radar wave and located out of contact with the radar apparatus, the cover member having a transmission portion allowing the radar wave to pass therethrough, a distance between the transmission portion and the receive antenna being shorter than 6 times a wavelength of the radar wave.

According to the present invention, it becomes possible to prevent the input level of a received reflected radar wave from becoming saturated in a receiver circuit of a radar apparatus which is disposed inwardly of a cover member such as a vehicle bumper.

Other advantages and features of the invention will become apparent from the following description including the drawings and claims.

BRIEF DESCRIPTION OF THE DRAWINGS

In the accompanying drawings:

FIG. 6 is a table showing determination results on whether radar wave reflected from a target can be detected normally for various values of the distance between the front surface of the antenna device and a bumper of the vehicle, and various values of the angle between the front surface of the antenna device and the bumper;

FIG. 9 is a diagram explaining an obstacle detecting process performed by the radar apparatus when the level of a received reflected radar wave becomes saturated in a receiver circuit of the radar apparatus.

PREFERRED EMBODIMENTS OF THE INVENTION

Figure 1:
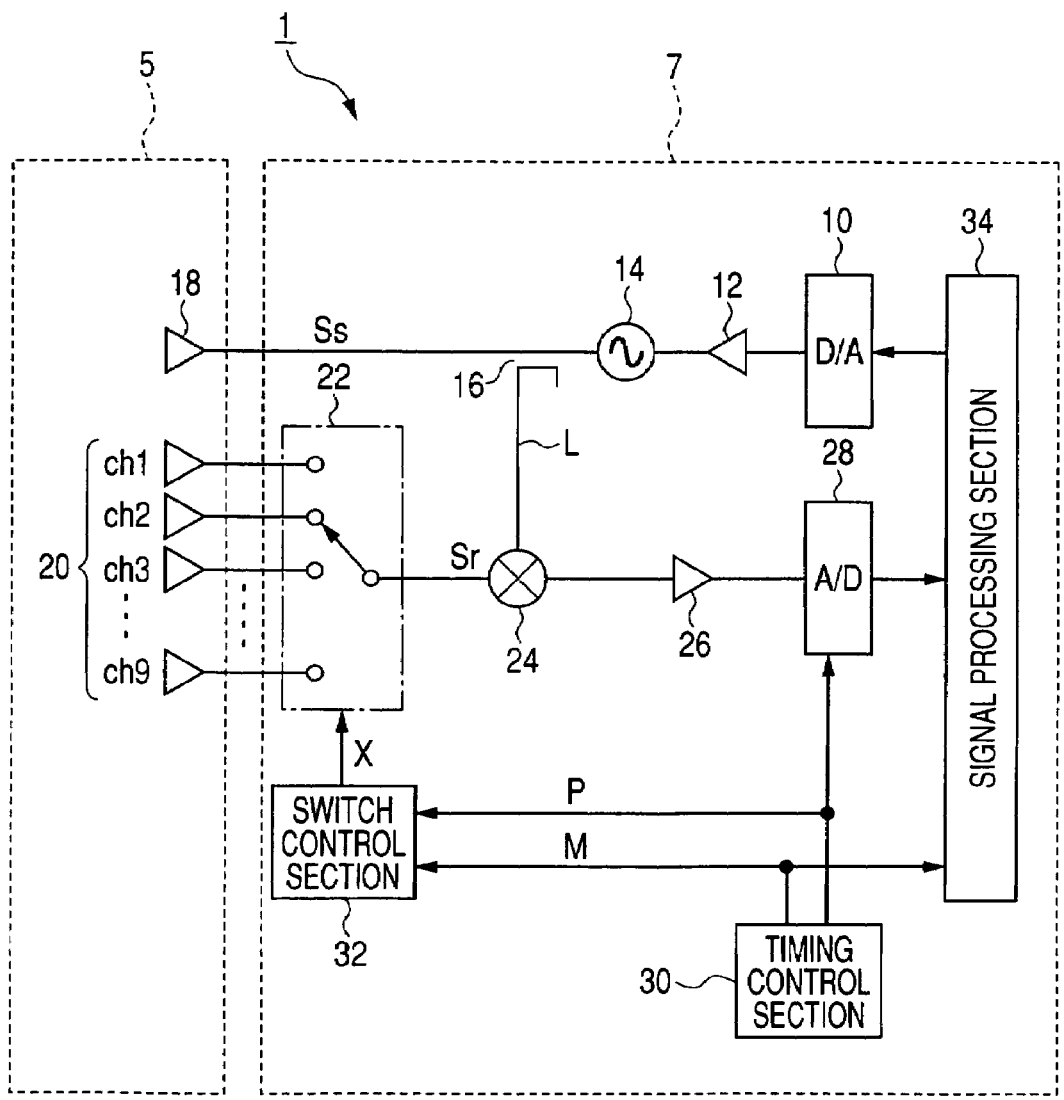
FIG. 1 is a block diagram showing an overall structure of a vehicle-mounted radar apparatus according to an embodiment of the invention.

FIG. 1 is a block diagram showing an overall structure of a vehicle-mounted radar apparatus according to an embodiment of the invention. As shown in FIG. 1, the radar apparatus 1 includes a D/A converter 10, a VCO (Voltage Controlled Oscillator) 14, a distributor 16, and a transmitting antenna 18. The D/A converter 10 generates an FMCW modulation signal having a triangular waveform in accordance with a modulation command. The VCO 14, which is applied with the modulation signal generated by the D/A converter 10 through a buffer 12, generates an output whose frequency varies depending on the modulation signal. The distributor 16 splits the output of the VCO 14 into a transmit signal Ss and a local signal L. The transmitting antenna 18 emits a radar wave in accordance with the transmit signal Ss.

The radar apparatus 1 further includes a receiving antenna 20 constituted by 9 element antennas for receiving reflected radar wave, a receiver switch 22, a mixer 24, an amplifier 26, and an A/D converter 28. The receiver switch 22 selects one of the 9 element antennas in accordance with a selection signal X, and supplies an output of the selected element antenna as a received signal Sr to the mixer 24. The mixer 24 mixes the received signal Sr supplied from the receiver switch 22 with the local signal L to generate a beat signal B. The amplifier 26 amplifies the beat signal B generated by the mixer 24. The A/D converter 28 samples the beat signal B amplified by the amplifier 26 in accordance with a timing signal P to convert the beat signal B into digital data.

The radar apparatus 1 still further includes a timing control section 30, a switch control section 32, and a signal processing section 34. The timing control section 30 generates the timing signal P and a mode signal M. The switch control section 32 generates the selection signal X in accordance with the timing signal P and the mode signal M supplied from the timing control section 30. The signal processing section 34 outputs the modulation command to the D/A converter 10 generated in accordance with the mode signal M received from the timing control section 30, and determines a distance to a target (an obstacle) reflecting the radar wave, a relative speed with the target, a direction of the target, etc., by signal-processing the sampled digital data supplied from the A/D converter 28.

The VCO 14 generates a millimeter-wave signal in accordance with the modulation signal of triangular wave shape, the millimeter-wave signal being modulated such that the frequency thereof increases and decreases linearly with time, having a center frequency Fo of 76.5 GHz and a frequency variation width $\Delta F$ of 100 MHz.

Each of the element antennas constituting the receiving antenna 20 has a beam width (an angular range within which gain reduction with respect to the front direction does not exceed 3 dB), which contains the whole of the beam width of the transmitting antenna 18. In this embodiment, these element antennas are respectively assigned to channel 1 to channel 9.

The timing control section 30 generates the timing signal P formed of a pulse train of a cycle period of $\Delta T$, and the mode signal M depending on control mode. The signal processing circuit 34, which is mainly constituted by a microcomputer including a CPU, a ROM, a RAM, etc., further includes an arithmetic processor (a DSP, for example) which performs FFT (high-speed Fourier transform) on the data received from the A/D converter 28. The signal processing circuit 34 performs the processing to generate the modulation command at a sweep time T of $Dpc \times \Delta T$, the sweep time T being a time needed for a modulation frequency varies from a lowest value to a highest value, and vice versa, Dpc being the number of data items to be obtained.

The signal processing circuit 34 further performs the processing to determine a distance to the target, a relative speed with the target, and a direction of the target on the basis of the sampled digital data of the beat signal B supplied from the A/D converter 28.

The distributor 16 power-splits the millimeter-wave signal which the VCO 14 generates in accordance with the modulation signal, in order to generate the transmit signal Ss and the local signal L. The transmit signal Ss is emitted from the transmitting antenna 18 as the radar wave.

The radar wave transmitted from the transmitting antenna 18 and reflected from the target is received by all of the element antennas constituting the receiving antenna 20. However, the mixer 24 is supplied with the receive signal Sr only from one of the receive channels chi (i being an integer from 1 to 9), which is selected by the receiver switch 22. The mixer 24 mixes the receive signal Sr with the local signal L supplied from the distributor 16 to generate the beat signal B. This beat signal B is amplified by the amplifier 26, sampled by the A/D converter 28 in accordance with the timing signal P, and then inputted to the signal processing section 34.

Figure 2A:
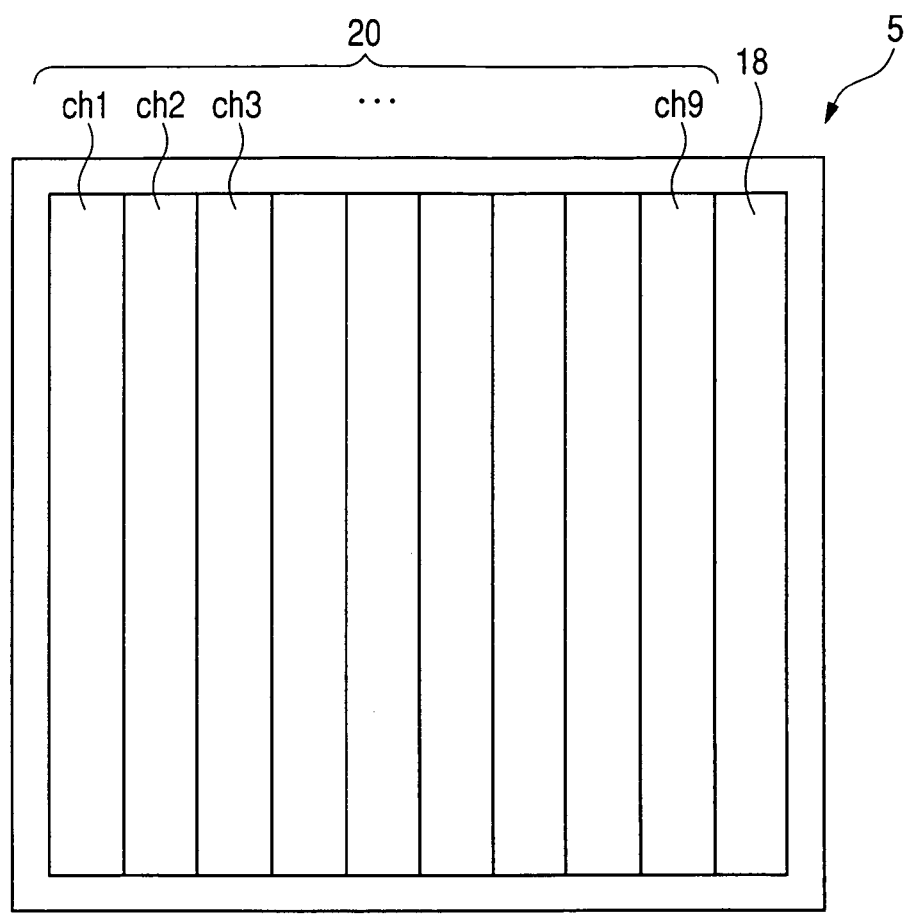
FIG. 2A is a front view of an antenna device of the vehicle-mounted radar apparatus shown in FIG. 1.
Figure 2B:
FIGS. 2B and 2C are diagrams showing examples of an antenna shape.
Figure 2C:
Figure 3A:
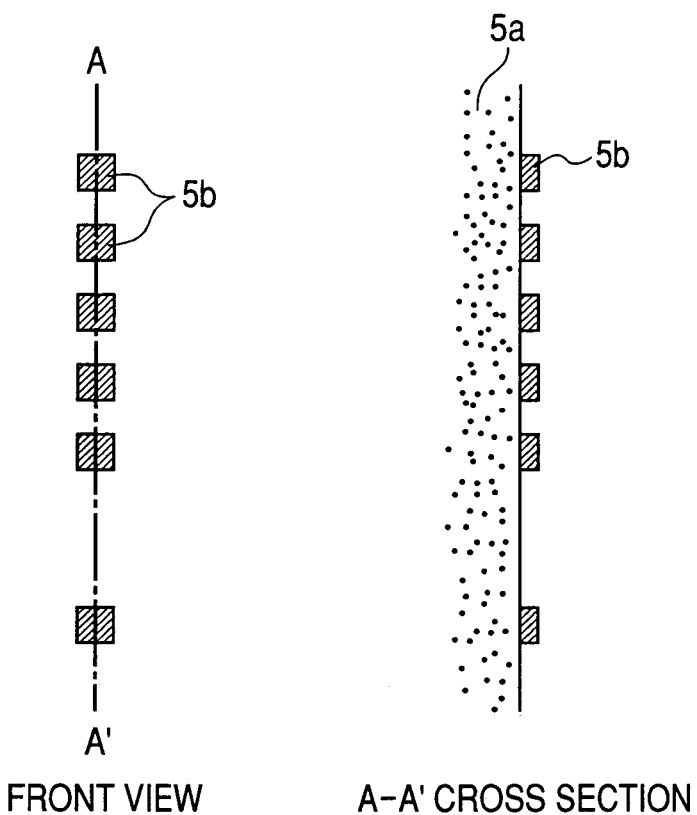
FIG. 3A is a diagram explaining the structure of an array antenna used for the antenna device.
Figure 3B:
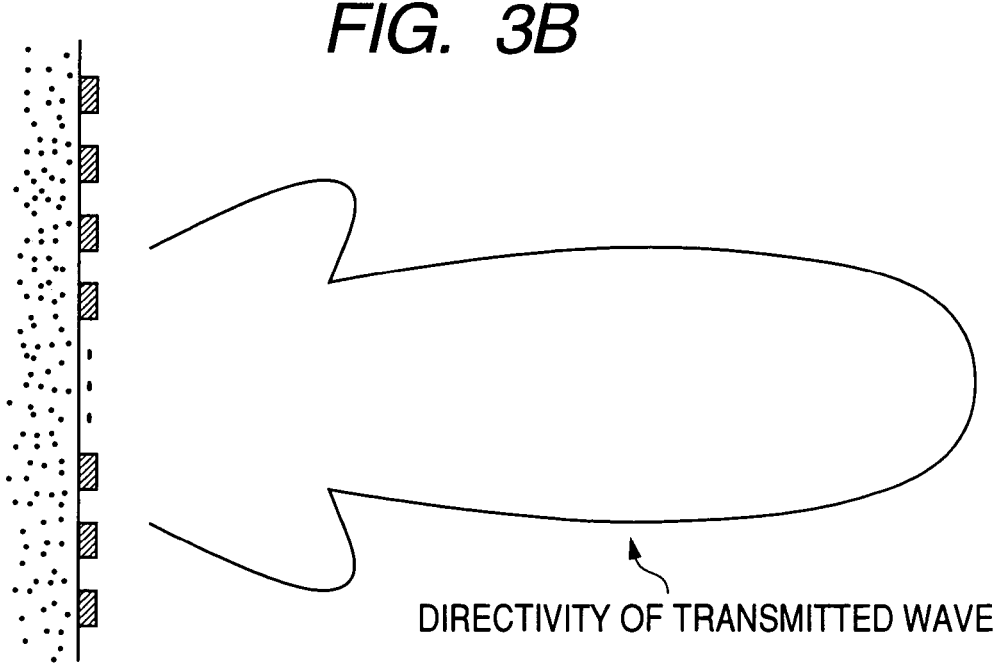
FIG. 3B is a diagram showing directivity of the array antenna.

As explained above, the radar apparatus 1 is configured to detect the reflected radar wave at the timing which overlaps the timing at which the radar wave is transmitted therefrom. Next, the structures of the transmitting antenna 18 and the receiving antenna 20 are explained with reference to FIGS. 2A to 2C and FIGS. 3A, 3B. FIG. 2A is a front view of an antenna device 5 including the transmitting antenna 18 and the receiving antenna 20. FIGS. 2B and 2C are diagrams showing examples of an antenna shape of the antenna device 5. FIGS. 3A to 3C are diagram explaining the characteristic of an array antenna.

The transmitting antenna 18 and the receiving antenna 20 are located on the same plane side by side as shown in FIG. 2A so as to constitute the single antenna device 5. Each of the transmitting antenna 18 and the receiving antenna 20 is assigned a predetermined area on the antenna device 5, and operates to transmit or receive the radar wave in the assigned area.

In more detail, each of the transmitting antenna 18 and the receiving antenna 20 is assigned one of portions of a transmission area of the antenna device 5, which are equally divided in the horizontal direction (in the lateral direction of the vehicle on which the radar apparatus 1 is mounted).

As shown in FIG. 2B, each of the transmitting antenna 18 and the element antennas of the receiving antenna 20 is constituted as an array antenna in which a plurality of the antennal elements 5b are arranged in a line. The antenna element 5b, which may be a patch type element or a horn type element, has a shape appropriate to the transmission frequency. As shown in FIG. 3A, each one of the channels is constituted by a plurality of the antenna elements 5b arranged in a vertical direction (the up and down direction of the vehicle on which the radar apparatus 1 is mounted).

The receiving antenna 20 includes a plurality of such channels arranged in the horizontal direction constituting a multi-channel structure. Incidentally, each of the channels has such a characteristic that as the vertical length thereof becomes long, the horizontal directivity thereof becomes weakened, and the vertical directivity thereof becomes strong (see FIG. 3B).

Figure 4:
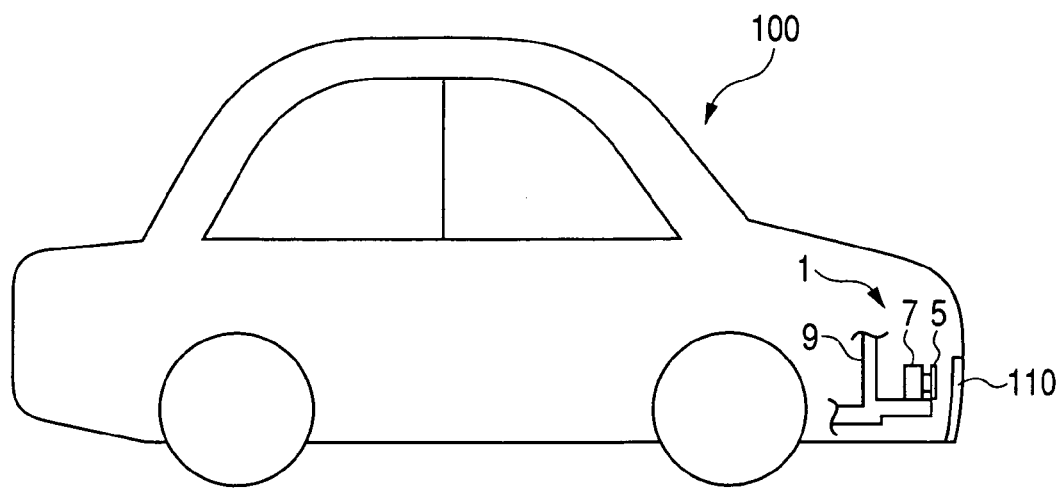
FIG. 4 is a diagram showing location of the radar apparatus mounted on a vehicle.
Figure 5:
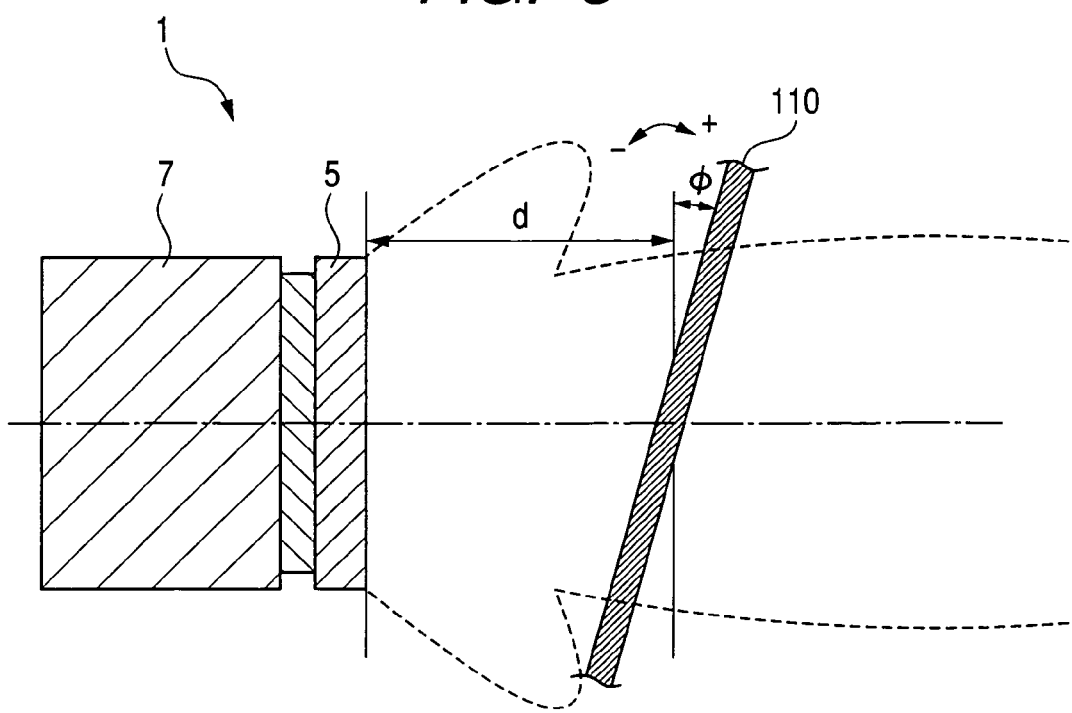
FIG. 5 is a partially enlarged diagram of FIG. 4, showing around the radar apparatus.

Next, installation of the radar apparatus 1 to a vehicle is explained with reference to FIG. 4 and FIG. 5. FIG. 4 is a diagram showing location of the radar apparatus 1 installed in a vehicle 100. FIG. 5 is a partially enlarged diagram of FIG. 4 around the radar apparatus 1.

As shown in FIG. 4, the radar apparatus 1 is located inwardly of a front bumper 110 as a cover member of the vehicle 100. The radar apparatus 1 is installed being covered by the bumper 110 so that it is invisible from the outside for the reason of visual design of the vehicle 100.

To increase the resistance of the radar apparatus 1 to the impact applied to the bumper 110 by a stone falling and hitting the bumper 110, the radar apparatus 1 is fixed to a radar holding member 9 which is formed as a part of the frame of the vehicle 100 so as not to be in contact with the bumper 110. As shown in FIG. 4, the radar apparatus 1 is installed such that it faces the bumper 110 at the side of the antenna device 5, and fixed to the holding member 9 at the side of a main body 7 thereof.

Also, the radar apparatus 1 is installed in the vehicle 100 to satisfy the condition that the distance d between the front surface of the antenna device 5 (may be referred to as "reference surface" hereinafter) and the bumper 110 along the radar center axis shown by the chain line in FIG. 5 is 15 mm, and the condition that the angle $\Phi$ between the front surface of the antenna device 5 perpendicular to the transmission direction of the radar wave and the surface facing the antenna device 5 of a transmission portion of the bumper 110 (the shaded portion in FIG. 5) is 3 degrees.

In this embodiment, the angle $\Phi$ is defined as positive when the lower portion of the bumper 110 is closer to the radar apparatus 1 than the upper portion of the radar apparatus 1, while it is defined as negative when the upper portion of the bumper 110 is closer to the radar apparatus 1 than the lower portion of the radar apparatus 1.

As shown in the after-described experiment result, there is no difference in the effect of suppressing the saturation of the input level of the received radar wave between when the angle $\Phi$ is positive and when the angle $\Phi$ is negative. Accordingly, it is possible to determine whether the angle $\Phi$ should be positive or negative from the viewpoint of design of the vehicle or locations of other devices.

The reason for providing such conditions of the distance d and the angle $\Phi$ is to make it hard for the radar wave reflected by the bumper 110 to be received by the radar apparatus 1 even when the radar apparatus 1 is located inwardly of the bumper 110. Here, when the level of the radar wave reflected by the bumper 110 is significantly large, if the transmit timing and the receive timing of the radar wave overlap each other as in the case of this embodiment, detection of the radar wave reflected from the target may become difficult.

The inventors of the present application determined optimum values of the distance d and the angle $\Phi$ through experiment. The experiment result is explained with reference to FIG. 6. FIG. 6 is a table showing determination results for various values of the distance d and various values of the angle $\Phi$. In this table, the white circle indicates that the radar wave from the target was able to be detected, and the cross mark indicates that the radar wave from the target was unable to be detected.

In this experiment, for each of different bumper materials A, B and C each made of resin material coated with paint, the output of the A/D converter 28 was measured in a state where they were located in front of the radar apparatus 1 as shown in FIG. 5 for various values of the distance d and the angle $\Phi$. In more detail, the output of the A/D converter 28 was measured while varying the distance d within a range of from 7.36 mm to about 50 mm, and the measurements results were checked for each of 5 mm-wide measurement regions. The angle $\Phi$ was varied in a range of ±5 degrees at steps of 1 degree.

From this experiment, it was found that appropriate outputs can be obtained from the A/D converter 28 irrespective of the value of the angle $\Phi$, if the distance d is smaller than 22.36 mm, or smaller than 6$\lambda$ ($\lambda$ being the wavelength of the radar wave, which is 3.29 mm in this embodiment).

From this experiment, it was also found that appropriate outputs can be obtained from the A/D converter 28 irrespective of the distance d, if the absolute value of the angle $\Phi$ is larger than 3 degrees, or if the absolute value of an angle between the transmission direction of the radar wave and the surface of the bumper 110 is smaller than 87 degrees.

As described above, the transmitting antenna 18 and the receiving antenna 20 of the radar apparatus 1 are covered on the side of the transmission direction of the radar wave by the bumper 110, which is located out of contact with the radar apparatus 1 and has the transmission portion allowing the radar wave to transmit therethrough, the transmission portion being out of perpendicular alignment with the transmission direction.

In the radar apparatus 1 described above, since the surface of the transmission portion of the bumper 110 is not perpendicular to the transmission direction of the radar wave, the radar wave reflected by the bumper 110 is hard to be directly received by the receiving antenna 20. This makes it possible to suppress the input level of the received radar wave from being saturated due to the reflection of the radar wave at the bumper 110.

Also, since the radar apparatus 1 is disposed out of contact with the bumper 110, the radar apparatus 1 is hardly affected by the vibration of the bumper 110 or impact applied to the bumper 110. The transmitting antenna 18 and the receiving antenna 20 of the radar apparatus 1 are covered by the bumper 110 provided with the transmission portion having a planar shape.

This ensures the position detecting function of the radar apparatus 1 even in the case where the transmitting antenna 18 and the receiving antenna 20 are covered by the bumper 110.

The receiving antenna 20 of the radar apparatus 1 has a shape elongated in one direction, and the radar apparatus 1 is covered by the bumper 110 having the transmission portion whose surface is tilted to the transmission direction of the transmitting antenna 10 when viewed in the direction perpendicular to the elongated direction of the receiving antenna 20 and the transmission direction.

Since the receiving antenna 20 has the shape elongated in one direction, the receiving antenna 20 has such a directivity that becomes strong in a particular direction having a certain angle with respect to the elongated direction of the receiving antenna 20. According to this embodiment having the above described topology, it is possible to prevent the reflected radar wave coming from the particular direction from entering the receiving antenna 20.

This makes it possible to prevent the input level of the received radar wave from becoming saturated, though the receiving antenna 20 has the shape elongated in one direction.

The radar apparatus 1 is disposed such that the surface of the transmission portion of the bumper 110 and the transmission direction of the radar wave forms an angle smaller than 87 degrees. The above experiment shows that such a disposition reliably prevents the input level of the received radar wave from becoming saturated.

The radar apparatus 1 is installed such that the distance between the transmission portion of the bumper 110 and the receiving antenna 20 is smaller than 6 times the wavelength of the transmitted radar wave. In this embodiment where a millimeter-wave of 76-77 GHz is transmitted as the radar wave, the radar apparatus 1 is installed such that the distance between the transmission portion of the bumper 110 and the receiving antenna 20 is shorter than 22.36 mm.

The above experiment shows that according to this embodiment, the input level of the received radar wave can be reliably prevented from becoming saturated. The radar apparatus 1 having the receiving antenna 20 that includes a plurality of the element antennas may be so configured as to detect the reflected radar wave while switching the element antennas in succession.

According to such a configuration, since the element antennas detect respectively the radar waves slightly different from one another depending on their positions, respectively, it is possible to improve the accuracy of target position detection.

The transmitting antenna 18 and the receiving antenna 20 of the radar apparatus 1 are located on the same plane. This makes it possible to simplify the antenna structure, because theses antennas can be formed integrally.

The radar apparatus 1 is held by the radar holding member 9. The radar holding member 9 has a function of preventing the input level of the received radar wave from becoming saturated, and a function of suppressing vibration of the bumper 110 or impact applied to the bumper 110 from affecting the radar apparatus 1.

Figure 7:
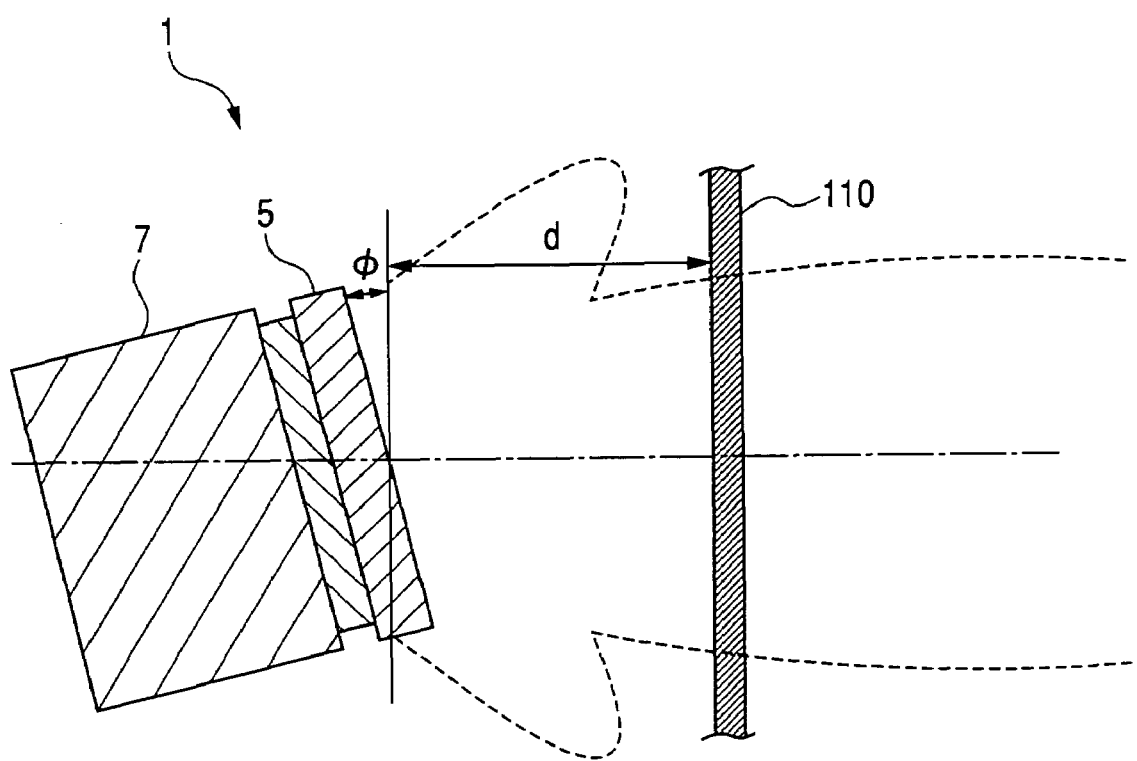
FIG. 7 is a diagram showing another location of the radar apparatus mounted on a vehicle.
Figure 8:
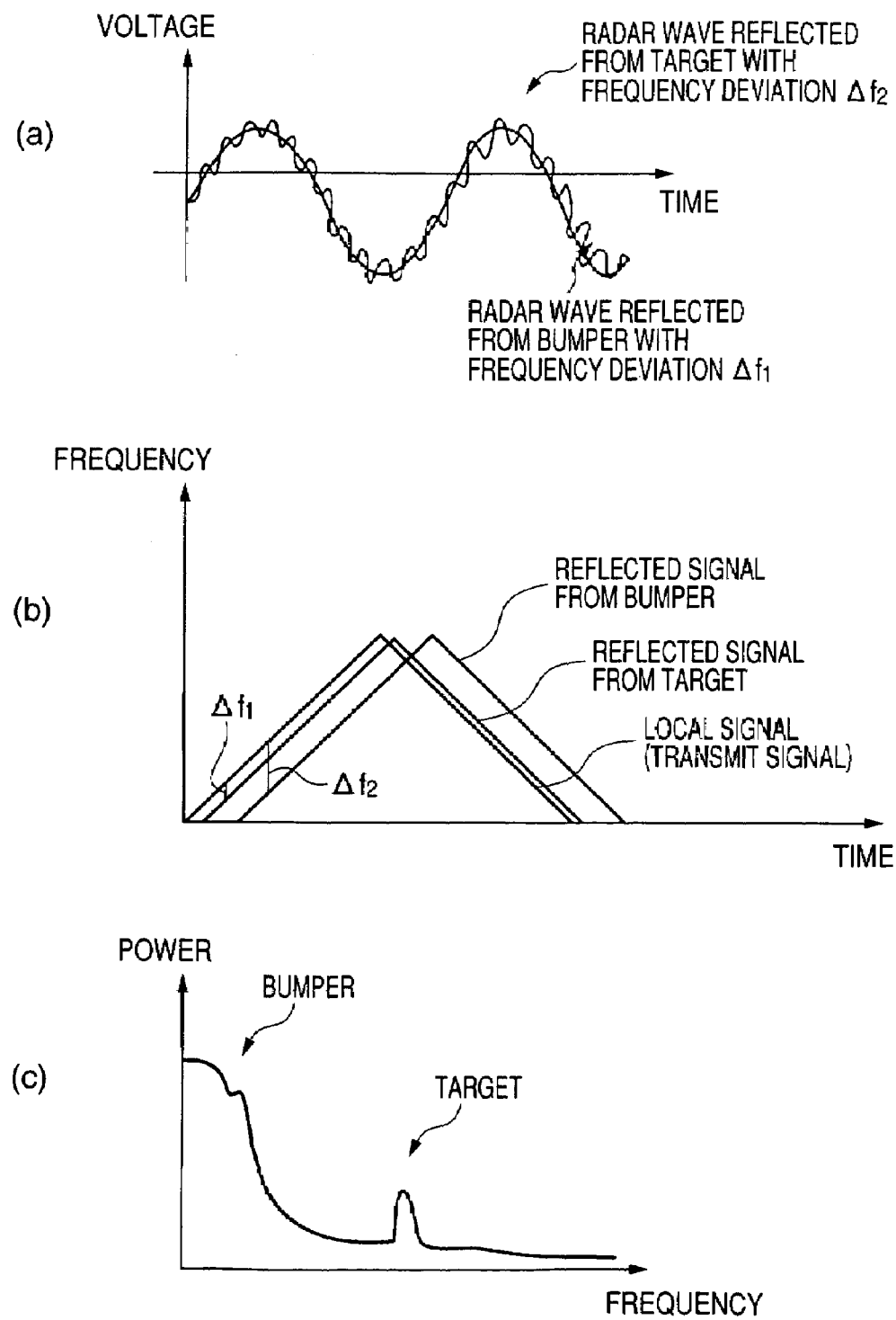
FIG. 8 is a diagram explaining an obstacle detecting process performed by a radar apparatus in a normal state.

It is a matter of course that various modifications can be made to the above described embodiment. For example, although the bumper 110 is tilted with respect to the transmission direction of the radar wave in order to prevent the input level of the received reflected radar wave from becoming saturated in the receiver circuit in the above embodiment, the bumper 110 may be un-tilted with respect to the transmission direction of the radar wave, that is, it may be perpendicular to the transmission direction of the radar wave, if the radar apparatus 1 itself is mounted tilted with respected to the transmission direction, as shown in FIG. 7.

However, in this case, the directivities of the transmitting antenna 18 and the receiving antenna 20 have to be adjusted so as to be aligned with the transmission direction. According to this configuration, since the transmitted radar wave can be prevented from being repeatedly reflected between the antenna device 5 and the bumper 110, it is possible to prevent the input level of the received reflected radar wave from becoming saturated in the receiver circuit.

In the above embodiment, the positional relationship between the radar apparatus 1 and the bumper 110 (the installation angle and the distance therebetween) is optimized to reduce the effect of the radar wave reflected by the bumper 110. However, the structure of the bumper 110 including paint, surface treatment, material, or its thickness may be optimized to reduce the effect of the radar wave reflected by the bumper 110.

The receiving antenna 20 may be a rectangular antenna as shown in FIG. 2C.

The above explained preferred embodiments are exemplary of the invention of the present application which is described solely by the claims appended below. It should be understood that modifications of the preferred embodiments may be made as would occur to one of skill in the art.

What is claimed is:

1. A radar apparatus comprising:
   an antenna device including a transmitting antenna and a receiving antenna;
   a main body which generates an FMCW-modulated radar wave, transmits the radar wave from the transmitting antenna at a transmit timing, and receives the radar wave reflected from an obstacle by the receiving antenna at a receive timing, the transmit timing and the receive timing temporally overlap each other at least partially; and
   a cover member covering the main body and the antenna device on a side of a transmission direction of the radar wave and located out of contact with the main body and the antenna device, the cover member having a transmission portion allowing the radar wave to pass therethrough, a surface of the transmission portion facing the antenna device being out of perpendicular alignment with the transmission direction.

2. The radar apparatus according to claim 1, wherein the transmission portion has a planar shape.

3. The radar apparatus according to claim 1, wherein the receive antenna has a shape elongated in one direction, the surface of the transmission portion forms a predetermined angle with the transmission direction of the radar apparatus when viewed in a direction perpendicular to the transmission direction and the one direction.

4. The radar apparatus according to claim 3, wherein the predetermined angle is greater than 3 degrees.

5. The radar apparatus according to claim 4, wherein a distance between the transmission portion of the cover member and the receiving antenna is shorter than 6 times a wavelength of the radar wave.

6. The radar apparatus according to claim 5, wherein the distance is shorter than 22.36 mm.

7. The radar apparatus according to claim 1, wherein the receiving antenna includes a plurality of element antennas assigned to different channels, the main body of the radar apparatus being configured to receive the radar wave reflected from the obstacle through one of the plurality of element antennas switched in succession.

8. The radar apparatus according to claim 1, wherein the radar apparatus is for vehicle use, and the cover member is a vehicle bumper.

9. The radar apparatus according to claim 1, wherein the transmitting antenna and the receiving antenna are located on the same plane.

10. A radar apparatus comprising:
    an antenna device including a transmitting antenna and a receiving antenna;
    a main body which generates an FMCW-modulated radar wave, transmits the radar wave from the transmitting antenna at a transmit timing, and receives the radar wave reflected from an obstacle by the receiving antenna at a receive timing, the transmit timing and the receive timing temporally overlap each other at least partially; and
    a cover member covering the main body and the antenna device on a side of a transmission direction of the radar wave and located out of contact with the main body and the antenna device, the cover member having a transmission portion allowing the radar wave to pass therethrough, a distance between the transmission portion and the receiving antenna being shorter than 6 times a wavelength of the radar wave.

11. The radar apparatus according to claim 10, wherein the radar apparatus is for vehicle use, and the cover member is a vehicle bumper.

12. The radar apparatus according to claim 10, wherein the transmitting antenna and the receiving antenna are located on the same plane.

13. A radar mounting structure for mounting a radar apparatus configured to transmit an FMCW-modulated radar wave at a transmit timing, and receive the radar wave reflected from an obstacle at a receive timing, the transmit timing and the receive timing temporally overlap each other at least partially, the radar mounting structure comprising:
    a frame member to which the radar apparatus is fixed; and
    a cover member covering the radar apparatus on a side of a transmission direction of the radar wave and located out of contact with the radar apparatus, the cover member having a transmission portion allowing the radar wave to pass therethrough, a surface of the transmission portion facing the antenna device being out of perpendicular alignment with the transmission direction.

14. A radar mounting structure for mounting a radar apparatus configured to transmit an FMCW-modulated radar wave at a transmit timing, and receive the radar wave reflected from an obstacle at a receive timing, the transmit timing and the receive timing temporally overlap each other at least partially, the radar mounting structure comprising:
    a frame member to which the radar apparatus is fixed; and
    a cover member covering the radar apparatus on a side of a transmission direction of the radar wave and located out of contact with the radar apparatus, the cover member having a transmission portion allowing the radar wave to pass therethrough, a distance between the transmission portion and the receive antenna being shorter than 6 times a wavelength of the radar wave.

* * * * *

UNITED STATES PATENT AND TRADEMARK OFFICE
CERTIFICATE OF CORRECTION

PATENT NO. : 7,705,771 B2  
APPLICATION NO. : 12/289012  
DATED : April 27, 2010  
INVENTOR(S) : Kato et al.

It is certified that error appears in the above-identified patent and that said Letters Patent is hereby corrected as shown below:

On the title page:

"(075) Inventors: Yasuke Kato, Nisshin, (JP); Akihisa Fujita, Kariya (JP); Yutaka Aoki, Nisshin (JP)"

should be --(075) Inventors Yusuke Kato, Nisshin (JP); Akihisa Fujita, Kariya (JP); Yutaka Aoki, Nisshin (JP)--

Signed and Sealed this

Twenty-second Day of June, 2010

David J. Kappos
*Director of the United States Patent and Trademark Office*